United States Patent [19]

Boakye et al.

[11] Patent Number: 5,759,632
[45] Date of Patent: Jun. 2, 1998

[54] CERAMIC COMPOSITE

[75] Inventors: Emmanuel E. Boakye, Dayton; M. Dennis Petry, New Paris; Randall S. Hay, Beavercreek, all of Ohio

[73] Assignee: The United States of America as represented by the Secretary of the Air Force, Washington, D.C.

[21] Appl. No.: 839,482

[22] Filed: Apr. 14, 1997

[51] Int. Cl.⁶ .......................... C04B 35/00; B05D 1/36
[52] U.S. Cl. ................. 427/419.2; 427/180; 427/372.2; 427/383.1; 427/383.3; 427/419.1; 501/152
[58] Field of Search ...................... 427/180, 372.2, 427/383.1, 383.3, 419.1; 501/152; 428/373, 374

[56] References Cited

U.S. PATENT DOCUMENTS

| 5,164,229 | 11/1992 | Hay .......................... 427/226 |
| 5,217,533 | 6/1993 | Hay et al. ................... 118/63 |
| 5,514,474 | 5/1996 | Morgan et al. ............. 428/375 |

*Primary Examiner*—Richard Weisberger
*Attorney, Agent, or Firm*—Charles E. Bricker; Thomas L. Kundert

[57] ABSTRACT

An improved method for producing a fiber-reinforced ceramic composite having a monazite interface between the reinforcing fiber and the ceramic matrix, which comprises the steps of coating each filament in a continuous fiber tow with an aqueous sol that forms monazite after high temperature heat treatment, heat treating the thus-coated fiber tow to provide a coated tow having a layer of monazite thereon, embedding the fiber in a suitable ceramic matrix, and densifying the composite.

1 Claim, No Drawings

CERAMIC COMPOSITE

RIGHTS OF THE GOVERNMENT

The invention described herein may be manufactured and used by or for the Government of the United States for all governmental purposes without the payment of any royalty.

BACKGROUND OF THE INVENTION

The present invention relates to ceramic composites and, in particular, to high temperature ceramic composites having a phosphate as the interphase material between the reinforcement and the ceramic matrix.

Tough ceramic fiber-matrix composites require that the fiber-matrix interface be sufficiently weak to deflect cracks and allow fiber pullout afterward, yet strong enough such that transverse strengths are not too low. Satisfactory fiber-matrix interface properties usually require a fiber coating that is either applied deliberately or formed from the reaction of the fiber and matrix. Problems with materials used, or under investigation for use, as fiber coatings include unsuitability for high temperature oxidizing environments, chemical incompatibility with currently available fiber and matrix materials, and intrinsic high-temperature instability.

Composites having a phosphate selected from monazites and xenotimes as the weak bond interface material are described in U.S. Pat. No. 5,514,474, issued May 7, 1996, to Morgan et al. Monazite comprises a family of phosphates having the form $MPO_4$, where M is selected from the larger trivalent rare earth elements of the lanthanide series, i.e., La, Ce, Pr, Nd, Pm, Sm, Eu, Gd and Tb, and coupled, substituted divalents and tetravalents, such as Ca or Sr with Zr or Th. Xenotimes are phosphates similar to monazite, where M is selected from Sc, Y, and the smaller trivalent rare earth elements of the lanthanide series, i.e., Dy, Ho, Er, Tm, Yb and Lu.

Morgan et al describe preparation of a first composite with sapphire fibers and a $LaPO_4$ interface in an alpha alumina matrix wherein the fibers are coated with $LaPO_4$ by dipping the fibers into a slurry of $LaPO_4$ powder in iso-butanol. Morgan et al describe preparation of a second composite with sapphire fibers and a $LaPO_4$ interface in an alpha alumina matrix wherein the fibers are laid, without prior coating, into a slurry of $LaPO_4$ powder and then overcoated with a deposit of the same slurry. In both composites, the $LaPO_4$ interface provided excellent crack deflection.

We have discovered an improved method for producing a monazite interface between a reinforcing fiber and an alumina matrix.

Accordingly, it is an object of the present invention to provide an improved method for producing a monazite interface between a reinforcing fiber and an alumina matrix.

Other objects and advantages of the present invention will be apparent to those skilled in the art.

SUMMARY OF THE INVENTION

In accordance with the present invention there is provided an improved method for producing a fiber-reinforced ceramic composite having a monazite interface between the reinforcing fiber and the ceramic matrix. The method of the present invention comprises the steps of coating each filament in a continuous fiber tow with an aqueous sol that forms monazite after high temperature heat treatment, heat treating the thus-coated fiber tow to provide a coated tow having a layer of monazite thereon, embedding the fiber in a suitable ceramic matrix, and densifying the composite.

DETAILED DESCRIPTION OF THE INVENTION

Fiber-reinforced ceramic composites are well known in the art. A variety of fibers (filaments) and ceramic materials are available. Of particular interest are single crystal and polycrystalline alpha-alumina, mullite and YAG fibers, and alpha-alumina, YAG and mullite matrices.

The filaments can be advantageously coated using the coating apparatus described by Hay et al, U.S. Pat. No. 5,217,533 and the coating method described by Hay, U.S. Pat. No. 5,164,229, both of which are incorporated herein by reference.

The aqueous sol is prepared from $La(NO_3)_3$ and $(NH_4)_2HPO_4$ in 1:1 proportion, then peptized with nitric acid. We have found that a concentration of about 40 g/l rhabdophane ($LaPO_4 \cdot xH_2O$) collodial sol provides a coating thickness about 100–500 nm.

A concern with monazite coatings is their high frictional shear stress during fiber pullout after crack deflection. If frictional shear stress is too high, the monazite sol described above can be modified by the addition of surfactants or polyelectrolytes, such as polyacrylates. A suitable polyacrylate is Duramax B1043, available from Rohm and Haas. The coating procedure must be modified so that the coating is heat treated under an inert atmosphere, such as argon. On heating, the carbon derived from decomposition of the surfactant/polyelectrolyte burns out, leaving porous monazite behind. The pore volume fraction can be adjusted by adding an appropriate quantity of surfactant/polyelectrolyte so as to achieve a desired fiber pullout shear friction after debonding.

The following examples illustrates the invention:

EXAMPLE I

Dense Monazite

A 40 g/l rhabdophane ($LaPO_4 \cdot xH_2O$) collodial sol was prepared from $La(NO_3)_3$ and $(NH_4)_2HPO_4$. The sol was peptized with nitric acid: 2.4 ml 70% nitric acid per 200 ml 40 g/l rhabdophane to attain the sol-to-gel transition point. The concentration of nitric acid in the sol was 6.8 g/l; the viscosity of the sol at the gel point was 6.74 centipoise. At this viscosity, the sol consisted of a network of particles having a particle size of about 5–50 nm.

The sol was applied to 3M Nextel 720 fiber using the previously mentioned coating apparatus at coating rates of 0.7 to 2.8 cm/sec at a maximum furnace temperature of 1300° C.

The coatings were characterized by optical microscopy, scanning electron microscopy and transmission electron microscopy. All these methods of characterization found the coatings to be continuous. The filament tensile strength after coating averaged 1.47 Gpa. Control fibers run through the coating furnace without application of the sol had average filament tensile strength of 1.51 GPa. In contrast, the filament tensile strength of filaments with solution-derived coatings were no greater than 1.07 GPA.

Example II

Monazite-Carbon Mixture

Rhabdophane ($LaPO_4 \cdot xH_2O$) particles were precipitated in aqueous solution by reacting lanthanum nitrate and phosphoric acid. The polyelectrolytes, Darvan C, Darvan 821A and Duramax B-1043, were added to the sol to make monazite-carbon mixtures. A problem expected in making these mixtures comprised prevention of phase segregation of the mixture into monazite- or carbon-rich regions. Homogeneity on the scale of 20 nm is needed for a coating thickness of 100 nm. Bonding the polyelectrolytes electrosterically, prior to heat treatment, increased the monazite-carbon homogeneity. The filament tensile strength of rhabdophane/Darvan A coated fibers averaged 1.56 GPa.

Various modifications may be made in the instant invention without departing from the spirit and scope of the appended claims.

We claim:

1. An improved method for producing a fiber-reinforced ceramic composite having a monazite interface between the reinforcing fiber and the ceramic matrix, which comprises the steps of coating each filament in a continuous fiber tow with an aqueous sol that forms monazite after high temperature heat treatment, heat treating the thus-coated fiber tow to provide a coated tow having a layer of monazite thereon, embedding the fiber in a suitable ceramic matrix, and densifying the composite.

* * * * *